United States Patent
Sundar et al.

(10) Patent No.: US 12,235,700 B2
(45) Date of Patent: Feb. 25, 2025

(54) SYSTEM AND METHOD FOR DYNAMIC VOLTAGE CONTROL

(71) Applicant: Meta Platforms Technologies, LLC, Menlo Park, CA (US)

(72) Inventors: Arun Sundar, Campbell, CA (US); Rajith Kumar Mavila, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 60 days.

(21) Appl. No.: 18/179,307

(22) Filed: Mar. 6, 2023

(65) Prior Publication Data
US 2024/0302882 A1 Sep. 12, 2024

(51) Int. Cl.
G06F 1/00 (2006.01)
G06F 1/3206 (2019.01)
G06F 13/42 (2006.01)
G06F 15/78 (2006.01)

(52) U.S. Cl.
CPC ........ *G06F 1/3206* (2013.01); *G06F 13/4286* (2013.01); *G06F 15/7807* (2013.01)

(58) Field of Classification Search
CPC . G06F 1/3206; G06F 13/4286; G06F 15/7807
See application file for complete search history.

(56) References Cited

U.S. PATENT DOCUMENTS

| 11,940,822 B2* | 3/2024 | Zhou | G05F 1/46 |
| 2004/0125514 A1* | 7/2004 | Gunther | G06F 1/26 361/1 |
| 2009/0037752 A1* | 2/2009 | Takiguchi | G06F 1/26 713/300 |
| 2013/0049720 A1* | 2/2013 | Nien | H02M 3/1588 323/271 |
| 2014/0032942 A1* | 1/2014 | Takehara | G06F 1/26 713/300 |
| 2014/0103993 A1* | 4/2014 | Chen | G05F 1/46 327/540 |
| 2014/0223205 A1* | 8/2014 | Muthukaruppan | G06F 1/3243 713/320 |
| 2014/0266141 A1* | 9/2014 | Isham | G06F 1/26 323/318 |
| 2018/0173286 A1* | 6/2018 | Luo | G06F 1/266 |
| 2019/0294227 A1* | 9/2019 | Luo | G05F 1/465 |

* cited by examiner

*Primary Examiner* — Xuxing Chen
(74) *Attorney, Agent, or Firm* — Greenberg Traurig, LLP

(57) ABSTRACT

The present disclosure relates to a system and a method for regulating an output voltage to a requested target voltage. The system includes a System-on-a-Chip (SoC) device and a Power Management Integrated Circuit (PMIC) having a voltage regulator. The SoC device configured to receive a requested target voltage, generates an analog voltage signal that steps up or down over time until the analog voltage signal corresponds to the requested target voltage, and outputs the analog voltage signal. The voltage regulator is configured to reference the analog voltage signal from the SoC device and supply a corresponding regulated output voltage to the SoC device.

20 Claims, 4 Drawing Sheets

SYSTEM AND METHOD FOR DYNAMIC VOLTAGE CONTROL

TECHNICAL FIELD

The present invention relates to the field of electronic devices and power management systems. As an example, the present invention relates to a system and dynamic voltage control method that minimize voltage transition latency in order to improve system responsiveness and power efficiency.

BACKGROUND

A System-on-Chip (SoC) device is an integrated circuit (IC) that integrates all computer and electronic components onto a single chip, including the central processing unit (CPU), graphic processing unit (GPU), memory, and peripheral interfaces. By combining multiple components onto a single device, it reduces size and cost, and increases performance and efficiency. In SoC devices, Dynamic Voltage and Frequency Scaling (DVFS) is used to manage active power consumption. According to the current workload, DVFS dynamically adjusts a component's operating voltage and frequency based on its current state.

For example, when the workload of a component in the SoC device is low, the operating voltage and frequency of the component are reduced, which reduces the power consumption, and when the workload is high, the operating voltage and frequency are increased, which improves performance. Using this approach, a SoC device can balance performance and power consumption, providing a good trade-off between the two. Moreover, this approach helps to reduce power consumption by preventing power overhead and to increase battery life in battery-powered devices as well as improve thermal management by decreasing the heat generated by the component.

Power Management Integrated Circuit (PMIC) is a type of integrated circuit that manages and regulates power supply to components such as a microprocessor or battery-powered chips in various electronic devices, including smartphones, laptops, and other battery-powered devices, to ensure stable and efficient power delivery. It provides voltage regulation, power sequencing, and protection against over-voltage, over-current, and over-temperature conditions. PMICs integrated with a voltage regulator are also widely used in a SoC system, where the voltage transfer between a voltage regulator and an SoC Device is typically done via a set of power rails, which are regulated voltage lines that supply power to various system components.

For example, an SoC requires a regulated lower voltage which is derived from a higher battery voltage through a voltage regulator which performs a "step-down" voltage translation. A voltage regulator can also monitor voltage levels and adjust them if necessary, such as when the system is in different power states or when the load changes. This helps to maintain stable power delivery to the components and prevent any power-related issues. With the voltage being regulated and transferred between the voltage regulator and the SoC device, the latency incurred can vary depending on the specific communication protocols used as well as power management architecture and design. This is typically a combination of the time required for regulation on both sides.

SUMMARY OF PARTICULAR EMBODIMENTS

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method and a system, wherein any feature mentioned in one claim category, e.g. method, can be claimed in another claim category, e.g. system, as well. The dependencies or references back in the attached claims are chosen for formal reasons only.

The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Technical Problem

DVFS is a commonly adopted power management technique used in SoC systems to manage their active power consumption. In a conventional SoC system, a SoC device requests voltage regulation from a voltage regulator through an interfacing handshake protocol, such as the Inter-Integrated Circuit (i2c) or the Serial Peripheral Memory Interface (SPMI). The handshake protocols and the response of the voltage regulator, however, take time to react and thus leading to inefficiency and waste of power.

For example, upon completion of the handshake protocol, the voltage regulator ramps up or down the voltage accordingly and provides the regulated voltage to the SoC device. By using this approach, the voltage of a rail domain is modulated in order to support an optimal operating point (Voltage, Frequency) for a given workload. Therefore, the inefficiencies of such DVFS processes can be attributed to the latency incurred in transitioning to the desired voltage points.

Specifically, the latency is determined by (i) overhead delays associated with transferring voltage update commands through handshake protocols (e.g., i2c, SPMI), (ii) inherent delays in the voltage regulator in responding to a command, and (iii) voltage ramp delays in the voltage regulator. Therefore, an object of the present invention is to minimize voltage transition latency, which improves system responsiveness and makes DVFS processes more energy efficient.

Solution to Problem

The solution is to bypass the protocol handshake. According to the present invention, a system can include a SoC device that receives voltage step signals from an external source. The SoC device generates desired analog voltage signals and sends them to a voltage regulator via a Digital-to-Analog Converter (DAC) unit. The voltage regulator receiving the analog output from the DAC would simply reference the voltage based on the signals. Since no handshake protocol is needed, the voltage regulator can respond immediately to the needs of the system.

According to the above example, the present invention eliminates the need to use an interfacing handshake protocol to make voltage requests to the voltage regulator. This is because a specific rail is configured to dynamically conduct DVFS processes. Additionally, in some examples according to the present invention, handshake protocols such as i2c or SPMI may still be adopted to support voltage regulation and make voltage updates to less critical power rails.

In the present invention, the SoC device includes a register/counter combination unit that provides a desired target voltage identifier value to the DAC unit. Voltage identifier (or voltage ID) is a digital value that maps to a unique voltage output from the voltage regulator. The output of the DAC unit is connected to a reference input of the voltage regulator. When a voltage update request is made, the software that controls the SoC power management writes the target voltage ID value to the register. As indicated by the target voltage ID value, the counter increments or decrements the voltage ID value until it reaches the desired target voltage ID value.

Furthermore, a programmable voltage offset value can be added to the voltage ID value to compensate for static/dynamic variations between the SoC device and the voltage regulator. The offset voltage is thus provided to the DAC unit, and the voltage regulator can quickly regulate the output voltages. Alternatively, the offset can be added to the output of the DAC unit through an additional programmable analog circuitry to further compensate for additional variations like "ground bounce". In some examples, the frequency of counter updates can be programmed to match a required voltage update rate. As a result, voltage updates can be made faster and voltage control latency can be minimized, which improves system responsiveness and reduces power waste.

DESCRIPTION OF EXAMPLE EMBODIMENTS

Figure 1:
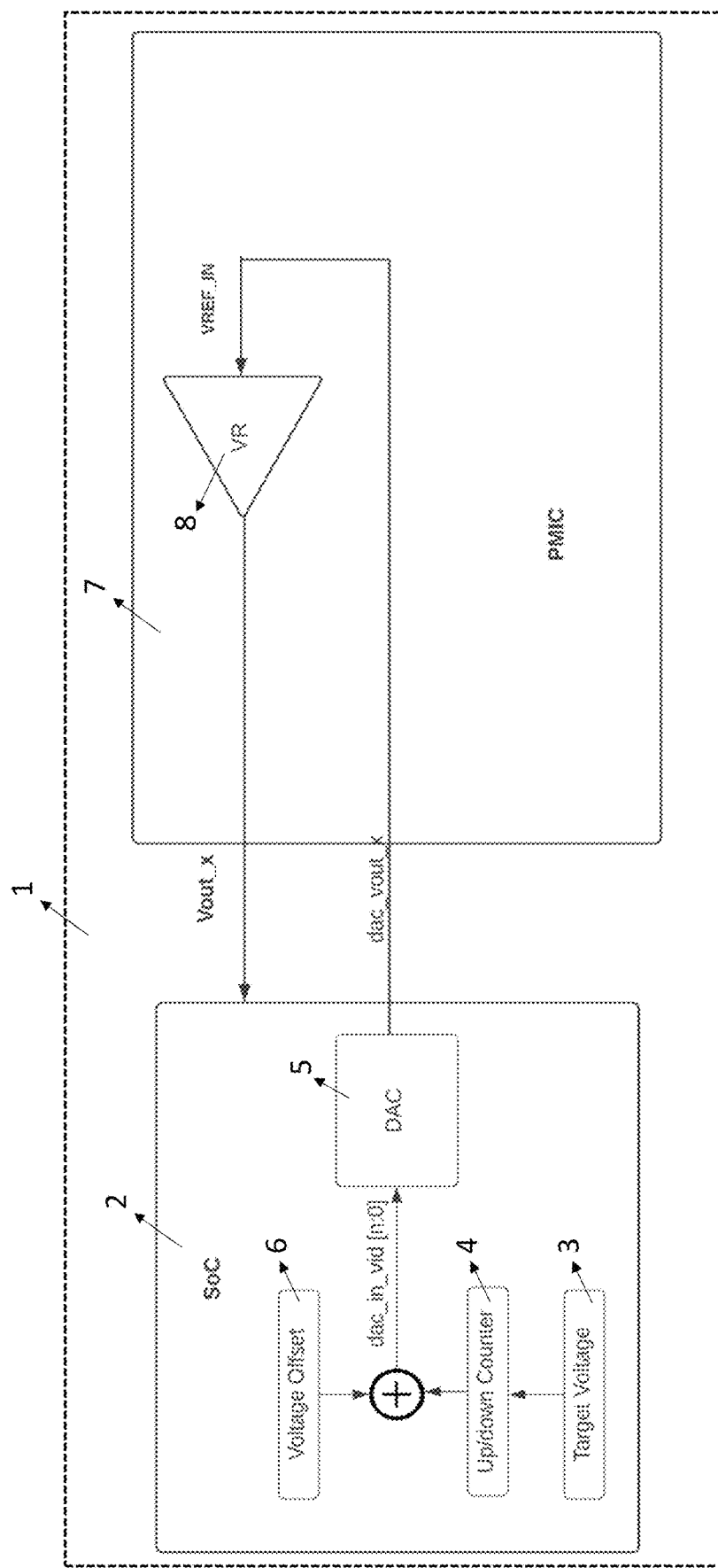
FIG. 1 is a plan view of an example system according to a first embodiment of the present invention.

The scope of the present invention encompasses all changes, variations, and modifications to the example embodiments described or illustrated herein that a person having ordinary skill in the art would comprehend. The scope of the present invention is not limited to the example embodiments described or illustrated herein. Moreover, although this disclosure describes and illustrates respective embodiments herein, any of these embodiments may include any combination of any of the examples, features, or steps described or illustrated anywhere herein that a person having ordinary skill in the art would comprehend.

In order to facilitate understanding of the present invention, positions, sizes, shapes, ranges, and the like of the components are not always indicated in the drawings. Therefore, the present invention is not limited to the positions, sizes, shapes, ranges, and the like shown in the drawings. Components expressed in the singular in the present specification are intended to include the plural unless clearly indicated in the context. For describing different embodiments, the same reference signs will be used for all those with the same function, and repetitive descriptions will be omitted in some cases. Further, the present invention is not construed as being limited to the description of the embodiment to be described below.

First Embodiment

A system and a dynamic voltage control method according to a first embodiment will be described with reference to FIG. 1 and FIG. 2.

In a first embodiment of the present invention shown in FIG. 1, the system 1 comprises a SoC device 2 and a PMIC 7 with a voltage regulator 8. The SoC device 2 includes a unit combining a register 3 and a counter 4. The register 3 and the counter 4 are both digital circuit components that are configured to store and manipulate binary data. The register 3 can be a memory element that can store a fixed number of bits, while the counter can be a type of register that increments or decrements its value by one each time it receives a trigger. By combining the register 3 and the counter 4, one can create a unit that can simultaneously store a value and increment or decrement it based on an input digital signal.

In the present embodiment, a target voltage input corresponding to a requested target voltage ID value can be provided to the register 3, when software or firmware (not shown) makes a voltage update request. The register 3 registers the requested target voltage ID value, and the counter 4 increments or decrements a voltage ID value by one each time from a current voltage ID value until the current voltage ID value equals the requested target voltage ID value. Although particular structures of the register 3 and the counter 4 are not shown in FIG. 1, those skilled in the art can appropriately dispose the register 3 and the counter 4 so as to read, store, and count a voltage ID value in the SoC device 2 in the state of being combined in one circuit component.

In the present embodiment, the SoC device 2 in FIG. 1 is provided with a DAC unit 5 that converts digital bits equivalent to the target voltage ID value into analog voltage signals. The DAC unit 5 is connected to the unit combining the register 3 and the counter 4. In a case where the register registers a requested target voltage ID value, the counter 4 increments or decrements a voltage ID value, and each time the counter updates the voltage ID value, the value is presented as a digital input (dac_in_vid [n:0]) to the DAC unit 5. As a result of each update, the DAC unit 5 converts the current digital input into an analog voltage until the requested target voltage is reached.

Furthermore, in the present embodiment, the DAC unit 5 is connected to the voltage regulator 8 of the PMIC 7 via a reference input domain (not shown) attached to the voltage regulator 8. The voltage regulator 8 thereof references the analog voltage output (dac_vout_x) generated from the DAC unit 5 via the reference input domain as an input (VREF_IN), makes adjustments to maintain a desired output voltage, and constantly supplies the output voltage (Vout_x) to the SoC device 2 through its output terminals (not shown).

In the present embodiment, the SoC device 2 can be configured to include a programmable voltage offset circuit 6, and the voltage offset circuit 6 is configured to provide a digital voltage offset ID value to compensate for any static/dynamic variations between the SoC device 2 and the voltage regulator 8 to ensure that the SoC device 2 receives a stable and consistent voltage supply. Static/dynamic variations can occur due to variations in electrical characteristics of a circuit or system, process variations, temperature changes, and other factors that can affect the voltage supplied. The voltage offset circuit 6 is programmed by the SoC's internal control circuits (not shown) and constantly adds an offset ID value to the current voltage ID value. Alternatively, the offset can be added to the output of the DAC unit through an additional programmable analog circuitry to further compensate for additional variations like "ground bounce".

Specifically, in one example of the present embodiment, if the voltage provided by the voltage regulator 8 is too high, the voltage offset can subtract a small voltage to bring it back to the desired level. Conversely, if the voltage supplied by the voltage regulator 8 is too low, the voltage offset can add a small voltage to the voltage supplied by the voltage regulator 8, bringing it back to the desired level. In this way, the voltage offset can help to ensure the SoC device 2 operates reliably and efficiently within its specified voltage range, preventing over-voltage or under-voltage conditions that could damage the SoC device 2 or affect its performance.

In another example for the present embodiment, ground bounce is a phenomenon where the ground voltage in a circuit fluctuates due to the inductance and resistance of the ground path. This can cause variations in the voltage supplied to the components in the circuit, which can lead to stability issues and affect the performance of the device. To compensate for ground bounce and other additional variations, the offset generated by the programmable voltage offset circuit 6 can be added to the output of the DAC unit 5 through an additional programmable analog circuitry (not shown). This circuitry is designed to further adjust the voltage output to ensure that it is stable and consistent.

In nonlimiting example for the present embodiment, by combining the digital voltage offset generated by the programmable voltage offset circuit 6 with an analog circuitry that can adjust the voltage output, the SoC device 2 can achieve a high level of accuracy and stability in its power management system. This can help to improve the performance and reliability of the device, particularly in applications where a stable and consistent voltage supply is critical.

In the present embodiment, the counter 4 can be programmed through a control algorithm using software to match the requested voltage update rates defined by the architecture of the voltage regulator. The control algorithm determines the counter's updating frequency and adjusts the output voltage of the DAC unit 5 to the desired level at that rate. In one example, the counter 4 stops updating the voltage ID value after the DAC unit 5 reaching the requested target voltage or maintaining it within an acceptable range for a set period of time. In another example, the counter 4 can be programmed to adjust the updating frequency to ensure the stability and accuracy of the voltage regulation.

Note that a method where a target voltage is requested and regulated using the system of the present invention will be described as an example hereinafter.

Figure 2:
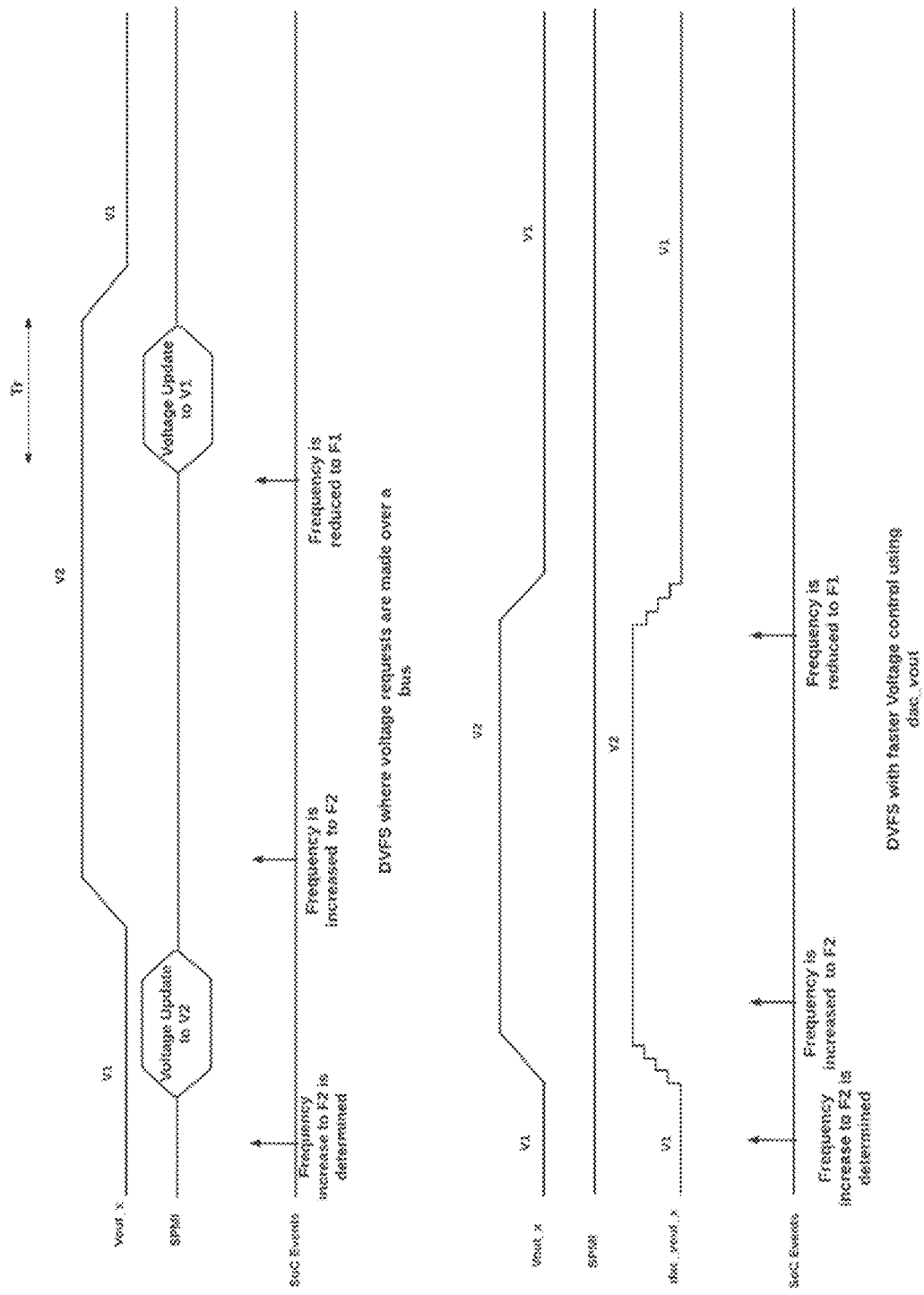
FIG. 2 is a timing diagram illustrating a DVFS process with reduced latency using the example system shown in FIG. 1.

FIG. 2 illustrates an example of the potential latency savings in voltage control from using the method of regulating the output voltage in a DVFS process, compared to the traditional method of regulating the output voltage using an interfacing handshake protocol such as SPMI. The timing diagram in the upper section of FIG. 2 shows the latency of the traditional method where voltage requests are made through the interfacing handshake protocol. In contrast, the timing diagram in the lower section of FIG. 2 shows the latency of the proposed method according to the present embodiment, which represents the steps of the proposed voltage regulating method using the described system in FIG. 1.

In one example related to the traditional method for changing workloads in a DVFS process of a system, an update request signal to increase the operating frequency from F1 to F2 and increase the output voltage (Vout_x) from V1 to V2 is sent to the voltage regulator through an interfacing handshake such as SPMI to regulate the voltage in response to frequency updates. The voltage regulator, after a certain response time Tr, continuously ramps up the voltage from V1 to V2 until both the frequency and voltage reach the desired level. Conversely, the voltage regulator ramps down the voltage when another request is received through the handshake protocol. Therefore, the overall time from receiving the update request to finishing the adjustment is defined as latency.

In the above example, the latency incurred in transitioning to the desired voltage points in a DVFS process can be determined by factors listed as follows. For example, once the traditional method determines the desired operating points, the latency defined comprises (i) overhead delays in transferring the voltage update command through a protocol-based interface like i2c or SPMI, (ii) inherent delays Tr in the voltage regulator of the PMIC 7 to take action once the command is received, and (iii) voltage ramp delays that correspond to the speed of the voltage regulator 8 in regulating the voltage in response to the command.

In one example related to the proposed method for regulating the output voltage in a DVFS process in the present embodiment, the SPMI interfacing handshake protocol is not involved. As illustrated in the lower section of FIG. 2, the DAC unit 5 in the SoC device 2 directly responds to the voltage update request and ramps up the voltage (dac_vout_x) in configurable steps, without any additional delays. The DAC unit 5 also ramps down the voltage in configurable steps and the output (Vout_x) decreases continuously at the same time. The use of the proposed method results in a shorter duration of the output voltage at V2 level. Therefore, the proposed method results in reduced latency for running workloads that require a higher voltage, thus improving system responsiveness and reducing power waste at the higher voltage once the workload is finished.

Specifically, the proposed method involves the following steps: (i) creating a system with a SoC device 2 and a PMIC 7 having a voltage regulator, (ii) configuring the SoC device 2 with a register 3, a counter 4, and a DAC unit 5, (iii) registering and stepping up or down a digital voltage ID value, (iv) reading and converting the digital voltage ID value to an analog voltage signal in the DAC unit 5, (v) increasing or decreasing an analog voltage in configurable steps in the DAC unit 5 until a requested target voltage is reached, (vi) sending the analog voltage output signal from the DAC unit 5 to the voltage regulator 8, (vii) referencing and matching the analog voltage output signal in the voltage regulator 8, and (viii) supplying the referenced analog voltage to the SoC device 2.

In the proposed method, the registering and counting step (iii) includes incrementing or decrementing a voltage ID value from a current voltage ID value until the current voltage ID value equals the requested voltage ID value. The step (v) of increasing or decreasing an analog voltage in configurable steps in the DAC unit 5 includes constantly reading a digital voltage ID and converting the digital voltage ID into an analog voltage signal accordingly. The step (vi) of sending the analog voltage output signal from the DAC unit 5 to the voltage regulator 8 includes connecting to a reference input domain of the voltage regulator 8 and constantly sending the converted analog voltage output to the reference input domain of the voltage regulator 8 until the requested target voltage is reached.

In one example of the proposed method, the method further comprises compensating for static/dynamic variations between the SoC device 2 and the voltage regulator 8 by adding an offset voltage ID value to the current voltage ID value via a programmable voltage offset circuit 6.

In another example of the proposed method, the method further comprises compensating for ground bounce and other additional variations to the output of the DAC unit 5 via a programmable voltage offset circuit 6 with an additional programmable analog circuitry (not shown).

Hereinafter, experimental results of an example method according to the first embodiment will be described.

Figure 3:
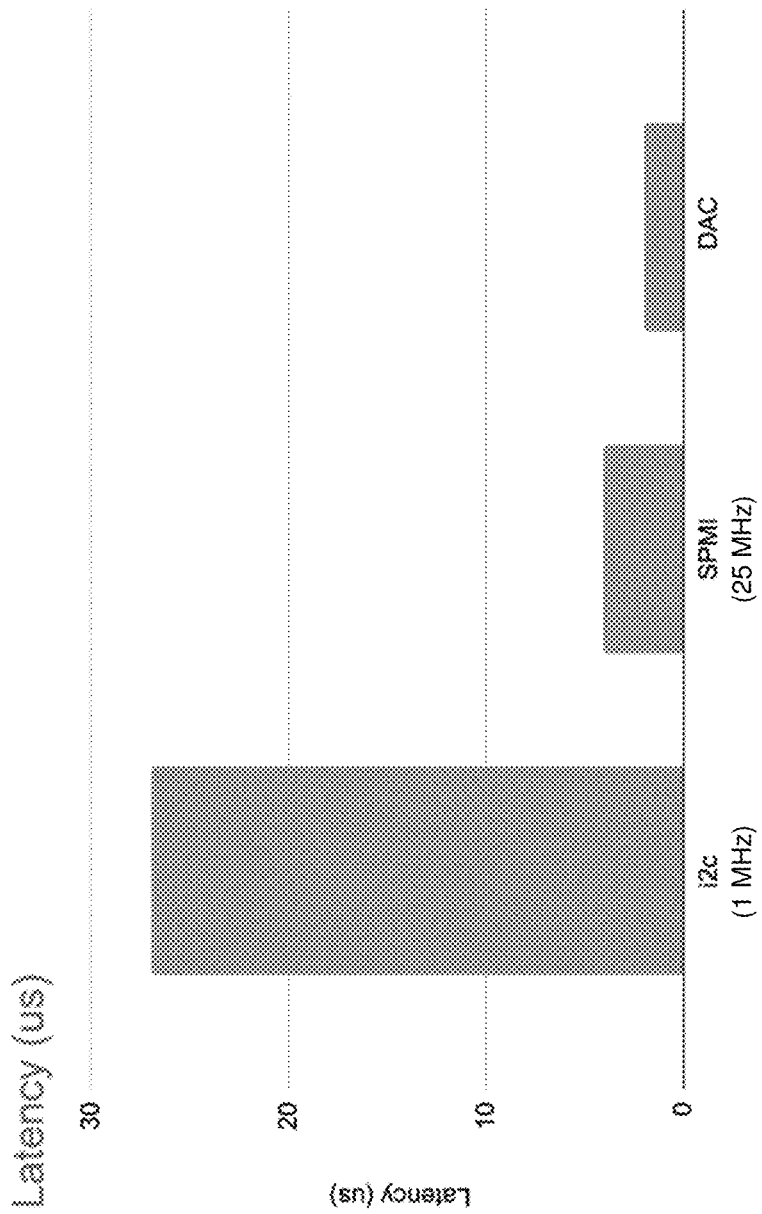
FIG. 3 is a graph of experimental results for describing the reduced latency using the example system shown in FIG. 1.

FIG. 3 describes the reduced latency for a voltage change of 200 mV using the example system shown in FIG. 1. The results in FIG. 3 show that the proposed method results in a significant reduction in latency compared to traditional methods where latencies are measured using i2c (1 MHz) or SPMI (25 MHz) interfacing protocols. The frequencies, such as 1 MHz and 25 MHz designated in the i2c and SPMI interfacing protocols, refer to a maximum clock frequency supported by each interface. In the traditional methods and the proposed method, the PMIC is configured to support a 100 mV/µs voltage ramp rate. The latency value achieved by using the DAC unit 5 in the proposed system and method is almost 10 times lower than the traditional i2c method and nearly half of the traditional SPMI method.

Additionally, FIG. 3 also shows that if the PMIC bandwidth is higher, the DVFS ramp rates increase. In FIG. 3, when comparing i2c and SPMI based on their clock frequencies, a 25 MHz SPMI interface with a higher bandwidth that can support higher data transfer rates than a 1 MHz i2c interface, leading to over 5 times reduced latency compared to the i2c method with a lower bandwidth. In comparison, the proposed method being described can further offer significant benefits in terms of reducing the latency of voltage updates, particularly in scenarios where the PMIC bandwidth is high.

Second Embodiment

A system and a dynamic voltage control method according to a second embodiment will be described with reference to FIG. 4. The second embodiment encompasses all the features outlined in the first embodiment, and it includes additional features as described below. To avoid redundancy, identical reference signs will be utilized for components with the same functions, and repetitive descriptions will be excluded from this embodiment.

Figure 4:
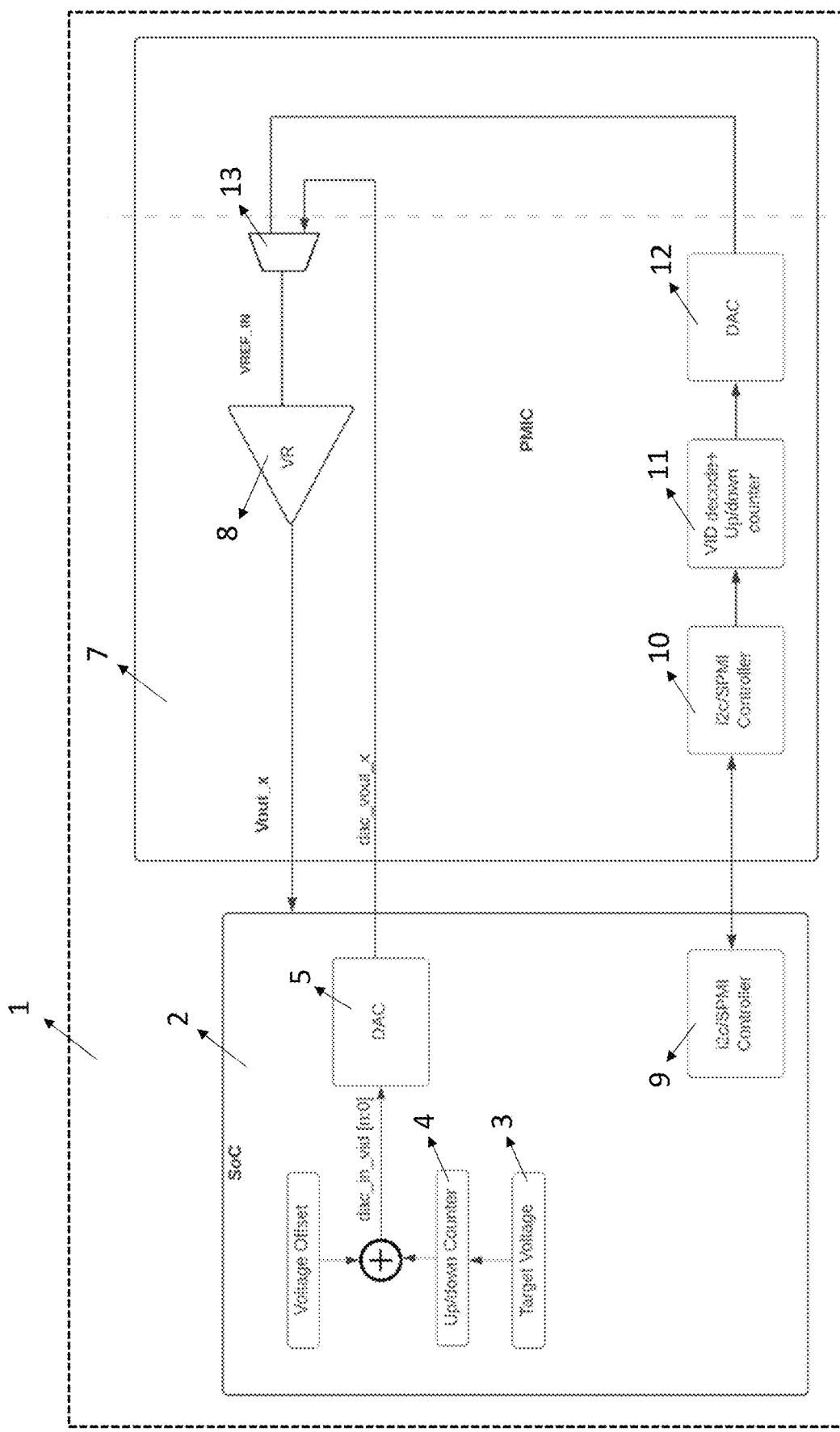
FIG. 4 is a plan view of an example system according to a second embodiment of the present invention.

FIG. 4 is a plan view of an example system according to the second embodiment of the present invention. As depicted in FIG. 4, the system 1 in this embodiment comprises a SoC device 2 and a PMIC 7 with a voltage regulator 8. The SoC device 2 includes a unit combining a register 3 and a counter 4. The register 3 and the counter 4 are both digital circuit components that are configured to store and manipulate binary data. The register 3 can be a memory element that can store a fixed number of bits, while the counter can be a type of register that increments or decrements its value by one each time it receives a trigger. By combining the register 3 and the counter 4, one can create a unit that can simultaneously store a value and increment or decrement it based on an input digital signal.

In one example of the second embodiment, both the SoC device 2 and the PMIC 7 include a controller that can transmit a digital voltage ID value through an interfacing handshake protocol such as i2c or SPMI. Specifically, the controller 9 in the SoC device 2 encodes a voltage ID value into a series of digital signals and sends them to the controller 10 in the PMIC 7. The combined register and counter unit 11 in the PMIC 7 then decodes and processes the voltage ID value. The counter of unit 11 increments or decrements a voltage ID value, and each time the counter updates the voltage ID value, the value is presented as a digital input to a DAC unit 12 in the PMIC 7. The updated value is then converted into an analog voltage until the requested target voltage is reached.

Furthermore, the DAC unit 12 in the PMIC 7 outputs an analog voltage converted from the current ID value presented by the unit 11 until the requested target voltage is reached. The voltage regulator 8 thereof takes inputs (VREF_IN) from both the DAC unit 5 in the SoC device 2 through the reference input domain (not shown) and the DAC unit 12. The voltage regulator 8 uses either the output voltage signal of the DAC unit 5 from the SoC 2 or the output internal DAC unit 12 inside the PMIC 7 and generates a regulated output voltage for the SoC device 2 through its output terminal (not shown).

In the present embodiment, a switch circuit 13 can be installed and configured on the controller 10 in the PMIC 7. In nonlimiting examples of the present embodiment, the switch circuit can be an analogue multiplexer. The switch circuit 13 can select an output source from the SoC device 2 to be sent to the voltage regulator 8. In one example, only the output from the DAC unit 5 is selected and the system operates in the same manner as described in the first embodiment. In another example according to the present embodiment, the DAC unit 12 is selected to be sent to the voltage regulator 8.

According to the above example, the method for regulating the voltage in this embodiment further comprises reading a digital voltage output signal from the SoC device 2 through an interfacing handshake protocol, which is subsequently converted by the DAC unit 12 configured on the PMIC 7. Additionally, the method comprises selecting an output signal sent from the SoC device 2 by the switch circuit 13 configured on the controller 10 of the PMIC 7. The selected output signal may be only the analog voltage signal sent by the DAC unit 5, or the output voltage signal of the DAC unit 12.

Reference Signs List

1 System
2 SoC device
3 Register
4 Counter
5, 12 DAC unit
6 Voltage Offset Circuit
7 PMIC
8 Voltage Regulator (VR)
9, 10 Controller
11 Decoder and Counter
13 Switch Circuit

What is claimed is:
1. A system, comprising:
a System-on-a-Chip (SoC) device configured to receive a requested target voltage, generate an analog voltage signal that steps up or down over time until the analog voltage signal corresponds to the requested target voltage, and output the analog voltage signal;
a Power Management Integrated Circuit (PMIC) having a voltage regulator, the PMIC being configured to receive the analog voltage signal from the SoC and send the analog voltage signal to the voltage regulator, wherein the voltage regulator is configured to reference the analog voltage signal from the SoC device and supply a corresponding output voltage to the SoC device;

a combined register and counter unit, wherein the register registers a requested target voltage ID value and the counter increments or decrements a voltage ID value from a current voltage ID value until the current voltage ID value equals the requested target voltage ID value; and a Digital-to-Analog Converter (DAC) unit configured to read a digital voltage ID value, convert the digital voltage ID value into an analog voltage signal, and increase or decrease the converted analog voltage signal, wherein the DAC unit constantly reads the current voltage ID value presented in the counter and increases or decreases the converted analog voltage signal in configurable steps.

2. The system according to claim 1, wherein the DAC increases or decreases the converted analog voltage signal based on a programmable voltage offset.

3. The system according to claim 2, wherein the programmable voltage offset is added to an output of the DAC.

4. The system according to claim 1, wherein the DAC unit is connected to a reference input domain of the voltage regulator, and constantly outputs the converted analog voltage signal to the reference input domain of the voltage regulator until the converted analog voltage reaches the requested target voltage.

5. The system according to claim 4, wherein the voltage regulator references the analog output voltage from the DAC unit via the reference input domain of the voltage regulator and constantly supplies the analog output voltage to the SoC device.

6. The system according to claim 4, wherein the SoC device includes a controller and an interfacing handshake terminal configured to connect with the voltage regulator.

7. The system according to claim 6, wherein the PMIC includes a controller having a switch circuit, and the switch circuit is configured to select an output signal sent from the SoC device.

8. The system according to claim 7, wherein the PMIC includes a DAC unit, and the DAC unit is configured to read a digital voltage output signal from the SoC device via an interfacing handshake protocol.

9. The system according to claim 1, wherein the SoC device includes a programmable voltage offset circuit, and the voltage offset circuit is configured to provide voltage offsets to compensate static and dynamic variations between the SoC and the voltage regulator by adding a voltage offset ID value to the current voltage ID value, wherein the voltage offset circuit includes an additional programmable analog circuitry to further compensate for additional variations.

10. The system according to claim 1, wherein the counter is programmed to match a requested target voltage and stop updating when the requested target voltage is reached.

11. A SoC device, configured to output a requested target voltage to a voltage regulator comprising:

a combined register and counter unit configured to register and count a digital signal, wherein the register registers a requested target voltage ID value and the counter increments or decrements a voltage ID value from a current voltage ID value until the current voltage ID value equals the requested target voltage ID value; and a DAC unit configured to read a digital voltage ID value and convert the digital voltage ID value into an analog voltage signal, wherein the DAC unit constantly reads the current voltage ID value presented in the counter and increases or decreases the converted analog voltage signal in configurable steps.

12. The SoC device according to claim 11, wherein the SoC device includes a programmable voltage offset circuit, and the voltage offset circuit is configured to provide voltage offsets to compensate for static and dynamic variations between the SoC and the voltage regulator by adding a voltage offset ID value to the current voltage ID value, wherein the voltage offset circuit includes an additional programmable analog circuitry to further compensate for additional variations.

13. The SoC device according to claim 11, wherein the counter is programmed to match a requested update target voltage and stop updating when the requested target voltage is reached.

14. A method comprising:

creating a system with a SoC device and a PMIC having a voltage regulator;

configuring the SoC device with a register, a counter, and a DAC unit;

registering and stepping up or down a digital voltage ID value;

reading and converting the digital voltage ID value into an analog voltage signal in the DAC unit;

increasing or decreasing an analog voltage in configurable steps in the DAC unit until a requested target voltage is reached;

sending the analog voltage signal that is output from the DAC unit to the voltage regulator;

referencing and matching the analog voltage output signal in the voltage regulator; and supplying the referenced analog voltage to the SoC device.

15. The method according to claim 14, wherein the registering and stepping includes incrementing or decrementing a voltage ID value from a current voltage ID value until the current voltage ID value equals the requested target voltage ID value.

16. The method according to claim 14, wherein increasing or decreasing the analog voltage in configurable steps in the DAC unit includes constantly reading a digital voltage ID value and converting the digital voltage ID value into an analog voltage signal.

17. The method according to claim 14, wherein sending the voltage output signal from the DAC unit to the voltage regulator includes connecting to a reference input domain of the voltage regulator and constantly sending the converted analog voltage output to the reference input domain of the voltage regulator until the requested target voltage is reached.

18. The method according to claim 14, further comprising compensating static and dynamic variations between the SoC and the voltage regulator by adding a voltage offset ID value to the digital voltage ID value, wherein adding the voltage offset ID values includes further compensating for additional variations.

19. The method according to claim 14, further comprising reading a digital voltage output signal from the SoC device via an interfacing handshake protocol by a DAC unit configured on the PMIC.

20. The method according to claim 19, further comprising selecting an output signal sent from the SoC device by a switch circuit configured on the PMIC.

* * * * *